Patented Sept. 21, 1948

2,449,804

UNITED STATES PATENT OFFICE 2,449,804

NITROALCOHOL ESTERS OF ACRYLIC ACID AND INTERPOLYMERS PRODUCED FROM THE SAME

Gaetano F. D'Alelio, Northampton, and James W. Underwood, Pittsfield, Mass., assignors to General Electric Company, a corporation of New York No Drawing. Original application February 1, 1940, Serial No. 316,816. Divided and this application December 22, 1944, Serial No. 569,424

11 Claims. (Cl. 260—83)

This application is a division of our copending application Serial No. 316,816, filed February 1, 1940, now abandoned, and assigned to the same assignee as the present invention.

This invention relates to the production of new materials and more particularly to nitroalcohol esters of an unsaturated acid, specifically acrylic acid, and to interpolymers produced from the same. These new esters and interpolymers produced therefrom have valuable and characteristic properties that make them especially suitable for use in industry, for example in molding, laminating, casting, coating and adhesive applications, and for other purposes.

The present invention resulted from our discovery that new and valuable products can be prepared by esterifying a nitroalcohol, e. g., 3-nitro-2-butanol, 2-nitro-3-hexanol, 2 nitro-1-butanol, etc., with an unsaturated (ethylenic or acetylenic) carboxylic acid, more particularly a carboxylic acid having the essential unit structure

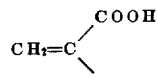

and specifically a carboxylic acid having the graphic formula

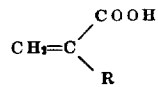

where R is a member of the class consisting of hydrogen, unsubstituted hydrocarbon radicals and substituted hydrocarbon radicals, for instance hydrocarbon radicals having substituent groups such, for example, as halogeno, carboxy, aceto, carboalkoxy, alkoxy, aryloxy, nitro, acyl, nitrilo (cyano), aldehydo (formyl), etc. Thus R may be, for instance, any aliphatic or carbocyclic radical, more specific examples of which are methyl, ethyl, propyl, isopropyl, butyl, sec.-butyl, isobutyl, amyl, isoamyl, hexyl, octyl, decyl, octadecyl, phenyl, halo-phenyl, halo-cresyl, xylyl, tolyl, naphthyl, phenoxyethyl, phenylethyl, phenylpropyl, cyclohexyl, o-methylcyclohexyl, etc. It will be noted that when R in the above formula represents hydrogen, the formula becomes

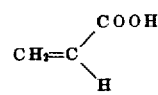

that is, the formula for acrylic acid. We have further discovered that these new nitroalcohol esters of unsaturated carboxylic acids, specifically nitroalcohol esters of acrylic acid, can be polymerized to yield synthetic materials of industrial importance, for example in the plastics and coating arts.

The scope of the present invention also includes compositions comprising an interpolymer of ingredients including (1) at least one nitroalcohol ester of an unsaturated carboxylic acid, specifically an acrylic ester of a nitroalcohol, and (2) at least one other organic compound copolymerizable with the said ester and containing a

grouping, more particularly a $CH_2=C<$ grouping, e. g., styrene, vinyl acetate, methyl acrylate, ethyl methacrylate, etc.

Various methods may be used to prepare the nitroalcohol esters with which the present invention is concerned. For instance, they may be prepared by direct esterification of a nitroalcohol with an unsaturated carboxylic acid, specifically acrylic acid, in the presence of an esterification catalyst, with or without the presence of other unreactive bodies to remove the water resulting from esterification. This method may be carried out continuously, that is, with continuous removal of water of esterification. These new esters also may be prepared by dehydration of a hydroxy acid ester obtained by reaction between a selected nitroalcohol and a hydroxy acid corresponding to the unsaturated carboxylic acid. Or, they may be prepared by deacidulation, e. g., dehalogenation or deacylation, of a corresponding acid derivative of the hydroxy acid ester resulting from reaction of the selected nitroalcohol with a hydroxy acid corresponding to the unsaturated carboxylic acid. The nitroalcohol esters of this invention also may be prepared from unsaturated nitriles or hydroxy nitriles (cyanohydrins) by causing to react therewith a nitroalcohol corresponding to the ester desired in the presence of water and an inorganic acid, followed by dehydration when starting with a cyanohydrin.

These new nitroalcohol esters may be polymerized separately, or mixed with each other, or mixed with other polymerizable material. The homogeneous and heterogeneous polymers vary from viscous masses to rubbery and hard, solid bodies, depending, for example, upon the extent of polymerization and the particular polymerizable or other modifying agent, if any, which is incorporated therewith. Heat, light, or heat and light may be used to effect polymerization, although under such conditions the rate of polymerization is relatively slow. Hence, to accelerate the polymerization we prefer to use a catalyst, accompanied by heat, light or heat and light. Examples of polymerization catalysts which may be used are ozone, ozonides, inorganic super-oxides such as barium peroxide, sodium peroxide, etc., aliphatic acyl peroxides, e. g., acetyl peroxide, lauryl peroxide, stearyl peroxide, etc., peroxides of the aromatic and the aliphatic-aromatic acid series, e. g., benzoyl peroxide, acetyl benzoyl peroxide, etc., various per-compounds such as perborates, persulfates, per-chlorates, etc., aluminum salts such as the halides, e. g., aluminum chloride, organic and inorganic acids such as methacrylic acid, hydrofluoric acid, etc., metal compounds of the unsaturated acids such, for instance, as cobalt and manganese resinates, linoleates, maleates, etc. Benzoyl peroxide is the preferred catalyst. Any suitable amount of catalyst may be used, but in general the catalyst concentration will be within the range of 0.1 to 2.0 per cent by weight of the whole. The rate of polymerization and the properties of the final product vary with the time, temperature, and, if a catalyst is used, also with the catalyst concentration. Polymerization of the individual or mixed esters or of polymerizable compositions containing these esters may be effected at from room temperature (20° to 30° C.) to temperatures above 100° C., for example about 130° C., but ordinarily we use temperatures within the range of 60° to 120° C. in causing polymerization.

When polymerized alone, the saturated nitroalcohol esters of unsaturated carboxylic acids, more particularly the saturated nitroalcohol esters of acrylic acid, usually form thermoplastic materials, that is, materials the shape of which easily can be changed by heat. The softening point, solubility and other properties of such esters depend, in general, upon the number of carbon atoms in, and the structure of, the ester chain. Some of the completely polymerized esters are clear, colorless or colored, transparent or opaque, rubbery, ductile bodies. Others are soft, free flowing, viscous masses at temperatures of about 100° C., yet highly viscous or soft, slightly mobile masses at room temperature. Some are hard solids while others possess properties intermediate to hard solids and dense, mobile, viscous masses.

The unsaturated (ethylenic or acetylenic) nitroalcohol esters of unsaturated carboxylic acids usually yield, when completely polymerized, insoluble, or infusible or insoluble and infusible masses.

In many applications the normally viscous, mobile polymers of high plastic flow are exceptionally valuable, particularly where non-volatilizing materials that can accommodate themselves to the form of the container are required. Particularly are they valuable when used alone, or when dissolved or dispersed in other dielectric materials including a liquid hydrocarbon such as mineral oil. This property of high plastic flow can be used to great commercial advantage in molding processes by interpolymerizing the monomers with other bodies of low plastic flow, thereby imparting the desired flow characteristics to the end product.

In other cases, for example where it is desired to raise the softening point, to decrease the solubility, or to produce insoluble, infusible or insoluble and infusible products, this may be done by copolymerizing a selected monomeric or partially polymerized nitroalcohol ester or esters of an unsaturated carboxylic acid, specifically acrylic acid, with an organic compound or compounds having the grouping —CH=C<, more particularly the grouping $CH_2$=C<. This compound is usually one which is readily polymerizable alone, although it need not be; the only requirement is that it be copolymerizable with the nitroalcohol ester, for example the ester of a monohydric aliphatic nitroalcohol with acrylic acid.

Illustrative examples of compounds that may be interpolymerized with our new nitroalcohol esters are esters containing ethylenic or acetylenic unsaturation in either the alcohol radical or the acid radical, or in both, e. g., saturated and unsaturated alcohol esters of unsaturated monocarboxylic and polycarboxylic acids, unsaturated alcohol esters of non-ethylenic polycarboxylic acids, unsaturated alcohol esters of saturated monocarboxylic acids, etc. Examples of non-ethylenic polycarboxylic acids are the saturated aliphatic polycarboxylic acids, for instance, succinic, adipic, glutaric, pimelic, sebacic, azelaic, suberic, tricarballylic, tartaric, citric, etc., cyclic polycarboxylic acids, more specifically the saturated cycloaliphatic polycarboxylic acids such as the cyclopropane dicarboxylic acids, the cyclohexane dicarboxylic acids, the alkyl cycloalkane polycarboxylic acids, etc., and the halogenated and non-halogenated aromatic polycarboxylic acids, e. g., phthalic, benzoyl phthalic, terephthalic, etc.

More specific examples of compounds that may be used in producing the interpolymerization products of this invention are, the unsaturated alcohol esters, e. g., the allyl, methallyl, crotyl, propargyl, 1-chloroallyl, 2-chloroallyl, cinnamyl, 3-methylallyl, vinyl, methvinyl, phenylallyl, 1-phenyl-2-propyn-1-yl, 3 - methyl-4-nonyn-3-yl, 4-methyl-5-decyn-4-yl, 4-methyl-5-undecyn-4-yl, etc., esters of saturated and unsaturated, aliphatic and aromatic monobasic and polybasic acids such, for instance, as acetic, propionic, butyric, valeric, caproic, acrylic, alkacrylic (e. g., methacrylic, ethacrylic, etc.), crotonic, oxalic, malonic, succinic, glutaric, adipic, pimelic, suberic, azelaic, sebacic, benzoic, toluic, phenylacetic, phthalic, terephthalic, benzoylphthalic, benzophenone-2, 4'-dicarboxylic, cinnamic, etc., including the alpha-unsaturated alpha, beta-polycarboxylic acids, e. g., maleic, monohalomaleic, fumaric, monohalofumaric, citraconic, mesaconic, acetylene dicarboxylic, aconitic, itaconic acid and its homologues as, for instance, alpha-methyl itaconic acid, alpha, alpha-dimethyl itaconic acid, etc.; and the saturated alcohol esters, e. g., the methyl, ethyl, propyl, butyl, isobutyl, ethylene glycol, glycerol, etc., esters of the unsaturated aliphatic polybasic acids, illustrative examples of which appear above.

Other compounds that may be interpolymerized with these new nitroalcohol esters to obtain valuable products are the vinyl cyclic compounds, e. g., styrene, methylstyrene, chlorostyrene including 2,4-dichlorostyrene, divinyl benzene, vinyl naphthalene, vinyl cyclohexane, methylene-tetrahydronaphthalene, vinyl furane, etc.; unsaturated ethers, e. g. ethyl vinyl ether, methallyl propyl ether, additional examples of other ethers of this class being given in D'Alelio application Serial No. 307,147, filed December 1, 1939, issued June 30, 1942, as Patent No. 2,288,315; unsaturated ketones, e. g., methyl vinyl ketone, methyl methvinyl ketone, ethyl methvinyl ketone, divinyl ketone, methyl alkyl ketone, etc.; 2-chlorobutadiene; methylene malonic esters, e. g., methylene dimethyl malonate, methylene diethyl malonate, additional examples being given in D'Alelio application Serial No. 304,783, filed November 16, 1939, issued September 21, 1943, as Patent No. 2,330,033; itaconic esters, e. g., dimethyl, diethyl, dipropyl, diallyl, dimethallyl, di-(methoxyethyl), dibenzyl, etc., itaconates, additional examples being given in D'Alelio applications Serial Nos. 294,493, 294,494, 294,495, 294,496 and 294,497, filed September 12, 1939, issued April 14, 1942, as Patents Nos. 2,279,881, 2,279,882, 2,279,883, 2,279,884 and 2,279,885, respectively, and Serial No. 302,169 filed October 31, 1939, issued February 9, 1943, as Patent No. 2,310,731; crotyl esters of non-ethylenic polycarboxylic acids, e. g., dicrotyl succinate, additional examples being given in D'Alelio application Serial No. 302,172, filed October 31, 1939, issued January 19, 1943, as Patent No. 2,308,494; and poly-(1-halogenoallyl) and poly-(2-halogenoallyl) esters of non-ethylenic polycarboxylic acids, e. g., di-(1-chloroallyl) adipate, di-(2-bromoallyl) succinate, additional examples being given in D'Alelio application Serial No. 302,171, filed October 31, 1939, issued May 25, 1943, as Patent No. 2,319,798.

Further examples of organic compounds that may be copolymerized with these new nitroalcohol esters to form new and valuable synthetic compositions are the polyesters of an unsaturated monohydric alcohol with a non-ethylenic polycarboxylic acid, e. g., diallyl succinate, additional examples being given in D'Alelio copending application Serial No. 302,168, filed October 31, 1939, now U. S. Patent 2,428,787; monoallyl esters of a monoesterifiable inorganic acid or of a non-phenolic monoesterifiable organic acid having no CH$_2$=C< groups, e. g., allyl chloride, allyl acetate, allyl furoate, additional examples being given in D'Alelio application Serial No. 302,173, filed October 31, 1939, issued January 19, 1943, as Patent No. 2,308,495; modified and unmodified unsaturated alkyd resins, e. g., glyceryl itaconate, diethylene glycol maleate or, in general, those produced by esterification of a polyhydric alcohol with an alpha-unsaturated alpha, beta-polycarboxylic acid alone or together with, say, up to 75 mol per cent (of the total polycarboxylic acid) of a non-ethylenic polycarboxylic acid or anhydride, e. g., phthalic acid or anhydride, or an unsaturated alkyd resin otherwise internally modified, additional examples of such alkyd resins being given in the above-identified copending applications, and, also, in D'Alelio copending applications Serial Nos. 302,174, now U. S. Patent 2,428,788, and 302,167, now U. S. Patent 2,407,479, filed October 31, 1939, in Nordlander copending applications Serial Nos. 302,165, now abandoned, and 302,166, now abandoned, and Nordlander and Margrave copending application Serial No. 302,164, filed October 31, 1939, now abandoned; acrylic and alkacrylic compounds, e. g., acrylic nitrile, methacrylic nitrile, esters of esterifiable acrylic compounds, e. g., methyl, ethyl, propyl, butyl, etc., acrylates and alkacrylates, for instance methyl methacrylate, methyl ethacrylate, ethyl methacrylate, ethyl ethacrylate, etc., additional examples of such compounds being given in the above-identified copending applications; and vinyl and vinylidene halides, e. g., vinyl chloride and vinylidene chloride, additional examples being given in D'Alelio copending application Serial No. 307,144, filed December 1, 1939, issued September 29, 1942, as Patent No. 2,297,290. The acrylic and alkacrylic compounds and the vinyl halides and esters are typical examples of compounds having at least one CH$_2$=C< grouping.

In order that those skilled in the art better may understand how the invention may be carried into effect, the following examples are given by way of illustration:

EXAMPLE 1

*Preparation of 2-nitroisobutyl methacrylate from alpha-hydroxy isobutyric acid and 2-nitroisobutanol*

This example illustrates the production of a nitroalcohol ester of an unsaturated carboxylic acid, specifically 2-nitroisobutyl methacrylate, indirectly by esterifying alpha-hydroxy isobutyric acid with 2-nitroisobutanol and then dehydrating the resulting ester with P$_2$O$_5$ to obtain 2-nitroisobutyl methacrylate,

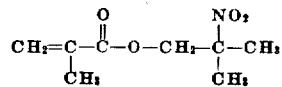

1 mol alpha-hydroxy isobutyric acid
1.22 mol 2-nitroisobutanol
Benzene in an amount equal to twice the volume of the alpha-hydroxy isobutyric acid and 2-nitroisobutanol
Concentrated sulfuric acid in an amount equal to 2% by weight of the alpha-hydroxy isobutyric acid were mixed and refluxed for eight hours in a Dean and Stark apparatus for the continuous removal of water of esterification. The esterification product was neutralized by mixing with anhydrous sodium carbonate and then distilling the neutralized mass. The solvent (benzene) was distilled off at atmospheric pressure and the excess alcohol at 60° to 100° C. under 2 mm. pressure. The 2-nitroisobutyl ester of alpha-hydroxy isobutyric acid distilled at 111° to 115° C. at 2 mm. pressure. This ester was dehydrated with P$_2$O$_5$ by adding 1 mol of the ester to 1 mol P$_2$O$_5$ suspended in sufficient benzene so that the mixture could be easily stirred. Hydroquinone (polymerization inhibitor) was added to the mass in an amount equal to 1% by weight of the ester. The mixture was continuously stirred, the reaction being allowed to proceed at room temperature for 1½ hours, and then was brought slowly to the refluxing (boiling) temperature of the mass over a period of one hour. It was held just below boiling temperature for 1 hour, thereafter being refluxed for 3 hours. After filtering the reaction mass, the benzene was distilled off at atmospheric pressure and a crude distillate of 2-nitroisobutyl methacrylate boiling at 85°–105° C. at 3 mm. pressure was obtained. The impure ester was washed with a 1% sodium hydroxide solution to remove any inhibitor and decomposition products, followed by washing with hydrochloric acid and thereafter with water. The washed ester was dried over anhydrous sodium carbonate and then redistilled, yielding a purified ester of 2-nitroisobutyl methacrylate boiling at 65°–70° C. at 0.5 mm. pressure.

A sample of the 2-nitroisobutyl methacrylate prepared as described above polymerized, without added catalyst, after heating for 5 days at 50° C. to a soft, rubbery, colorless mass. Upon prolonged heating, it was converted into a hard mass. With 0.1% by weight benzoyl peroxide the above

EXAMPLE 2

*Preparation of 2-nitroisobutyl methacrylate from methacrylic acid and 2-nitroisobutanol*

This example illustrates the production of 2-nitroisobutyl methacrylate by the direct esterification of methacrylic acid with 2-nitroisobutanol.

1 mol crude methacrylic acid containing polymerization inhibitor
1.1 mol 2-nitroisobutanol
Benzene in an amount equal to the volume of the methacrylic acid
Para-toluenesulfonic acid monohydrate in an amount equal to 7% by weight of the methacrylic acid were refluxed until no more water of esterification was given off. The reaction mass was neutralized by mixing for one hour with anhydrous sodium carbonate, filtered and distilled. The benzene was removed at below 65° C. at 98 mm. pressure. Due to the close boiling point of 2-nitroisobutanol and 2-nitroisobutyl methacrylate, the excess nitroalcohol distilled over with the nitromethacrylate at 78°-196° C. at 1 mm. pressure. The mixture was cooled in a bath of alcohol and solid carbon dioxide, and then filtered. In this way almost all of the excess nitroalcohol was separated from the nitromethacrylate. The crude nitromethacrylate was washed with a 1 per cent solution of sodium hydroxide, then with hydrochloric acid and finally with water. After drying for 3 hours over anhydrous sodium carbonate, the crude, washed and dried ester was redistilled. Some nitroalcohol was separated at 60°-70° C. at 1 mm. pressure. The purified ester boiled at 85°-94° C. at 1 mm. pressure.

A sample of the above 2-nitroisobutyl methacrylate in which was incorporated 0.1 per cent by weight benzoyl peroxide polymerized in less than 84 hours at 90° C. to a hard, colorless mass.

EXAMPLE 3

*Preparation of 2-nitroamyl methacrylate from methacrylic acid and 2-nitro-1-pentanol*

Essentially the same procedure was followed in preparing 2-nitroamyl methacrylate as described under Example 2 with reference to the production of 2-nitroisobutyl methacrylate.

1 mol crude methacrylic acid containing polymerization inhibitor
1 mol 2-nitro-1-pentanol
Benzene in an amount equal to the volume of the methacrylic acid
Paratoluenesulfonic acid monohydrate in an amount equal to 7% by weight of the methacrylic acid were refluxed until no more water of esterification was given off. The reaction mass was neutralized by mixing for one hour with anhydrous sodium carbonate, filtered and distilled. The benzene was removed at 55°-70° C. at 220 mm. pressure, which fraction also probably included some alcohol. All the remaining distillate boiling below 90° C. was discarded as alcohol and the fraction boiling at 93°-110° C. at 1 mm. pressure was saved as crude 2-nitroamyl methacrylate. This impure methacrylate was washed, dried and redistilled in essentially the same way as was the crude 2-nitroisobutyl methacrylate of Example 2. The purified ester was a colorless liquid boiling at 108°-110° C. at atmospheric pressure.

A sample of the above 2-nitroamyl methacrylate in which was incorporated 0.1 per cent by weight benzoyl peroxide polymerized in less than 84 hours at 90° C. to a hard, brittle, brown resinous mass.

EXAMPLE 4

*Preparation of 2-nitrobutyl acrylate from lactic acid and 2-nitro-1-butanol*

This example illustrates the preparation of an acrylic ester of a nitrobutyl alcohol, specifically 2-nitrobutyl acrylate, indirectly by esterifying lactic acid with 2-nitro-1-butanol and then dehydrating this lactic ester to obtain the nitroacrylate.

1 mol lactic acid
1.2 mol 2-nitro-1-butanol
Benzene in an amount equal to 2½ times the volume of 2-nitro-1-butanol
Concentrated sulfuric acid in an amount equal to 2.5% by weight of the lactic acid were refluxed until no more water of esterification was given off. The 2-nitrobutyl lactate was washed first with sodium carbonate solution and then with water, followed by drying over anhydrous sodium carbonate. Without isolating this lactic ester it was dehydrated as follows:

Assuming 100 per cent yield of lactic ester, ⅓ mol $P_2O_5$ was taken for each mol of ester and mixed with 2½ times its weight of benzene containing a trace of hydroquinone as a polymerization inhibitor. The benzene solution of the ester was added slowly to the suspension of phosphorus pentoxide in benzene and then refluxed for ½ hour. After removing the benzene by distillation at atmospheric pressure, distillation was continued to remove the water and dehydrated 2-nitrobutyl lactate. 2-nitrobutyl acrylate (dehydrated 2-nitrobutyl lactate) was collected as the fraction boiling at approximately 87° C. at 3 mm. pressure, being obtained as a two-phase system with the water of dehydration. This ester was dried for about 16 hours in contact with anhydrous sodium sulfate and then polymerized alone and copolymerized with other materials.

A sample of the above 2-nitrobutyl acrylate having incorporated therewith 0.1 per cent benzoyl peroxide polymerized in less than 60 hours at 90° C. to a hard, brittle resinous mass.

It will be understood, of course, that methods and reagents other than those given above by way of illustration may be used in preparing nitroalcohol esters of unsaturated carboxylic acids, specifically nitroalcohol esters of acrylic acid. Thus, instead of using phosphorus pentoxide as a dehydrating agent, other dehydrating materials may be employed, for example, phosphorus trioxide, anhydrous acid potassium sulfate, anhydrous acid sodium sulfate, etc. Nonvolatilizing or high-boiling polymerization inhibitors other than hydroquinone also may be used, e. g., copper, copper salts, sulfur, phenol, cresols, the xylenols, pyrogallol, resorcinol, etc.

By one or another of the methods described above, or by other methods, the unsaturated carboxylic esters, specifically the arcylic esters, of other nitroalcohols may be prepared, for example the aforementioned esters of such nitroalcohols as, for instance, the following:

3-nitro-2-pentanol
3-nitro-4-heptanol
2-nitro-1-pentanol
3-nitro-2-hexanol
5-nitro-4-octanol
1-nitro-2-butanol
1-nitro-2-pentanol
2-nitro-3-pentanol
2-methyl-2-nitro-1-propanol
3-methyl-3-nitro-2-butanol
2-methyl-2-nitro-3-hexanol
2-methyl-2-nitro-1-butanol
3-methyl-3-nitro-2-pentanol
3-methyl-3-nitro-4-heptanol
3-methyl-2-nitro-1-butanol
4-methyl-3-nitro-2-pentanol
2-methyl-3-nitro-4-heptanol
1-phenyl-2-nitro-1-propanol
3-methyl-1-nitro-2-butanol
4-methyl-2-nitro-3-pentanol
2-methyl-4-nitro-3-hexanol
2-nitro-2,4-dimethyl-3-pentanol
4-nitro-2-methyl-2-heptanol
4-nitro-2,4-dimethyl-3-hexanol
4-nitro-2,5-dimethyl-3-hexanol
2-methyl-2-nitro-1,3-propanediol
2-propyl-2-nitro-1,3-propanediol
2-isopropyl-2-nitro-1,3-propanediol
3-ethyl-2-nitro-1,3-propanediol
trimethylol nitromethane, etc.

Such nitroesters of unsaturated carboxylic acids, more particularly acrylic esters of nitroalcohols, may be polymerized as above described to yield compositions of value in the plastics and coating arts. The monomeric and polymeric nitroesters are, due to the nitro group which they contain, particularly valuable as plasticizers for high molecular weight bodies, for example polyvinyl halides, cellulose derivatives, e. g., cellulose esters such as cellulose acetate, cellulose propionate, cellulose acetobutyrate, etc.

The following examples are illustrative of the production of interpolymerization products. In all cases 0.1 per cent by weight benzoyl peroxide was incorporated into the mixture of monomeric components, which thereafter were copolymerized by heating for 14 hours at 50° C., followed by heating for 8½ hours more at 90° C. All parts are by weight.

EXAMPLE 5

|  | Parts |
|---|---|
| 2-nitroisobutyl methacrylate | 50 |
| Methyl methacrylate | 50 | yielded a hard, thermoplastic copolymer which was harder than polymerized 2-nitroisobutyl methacrylate alone, but slightly softer than polymerized methyl methacrylate.

EXAMPLE 6

|  | Parts |
|---|---|
| 2-nitroisobutyl methacrylate | 50 |
| Ethyl methacrylate | 50 | gave a hard, thermoplastic interpolymer having about the same hardness as polymerized 2-nitroisobutyl methacrylate and slightly harder than ethyl methacrylate when polymerized alone.

EXAMPLE 7

|  | Parts |
|---|---|
| 2-nitroisobutyl methacrylate | 50 |
| Methyl acrylate | 50 | formed a hard, thermoplastic copolymer which was slightly softer than polymerized ethyl methacrylate.

EXAMPLE 8

|  | Parts |
|---|---|
| 2-nitroisobutyl methacrylate | 50 |
| Ethyl acrylate | 50 | yielded a firm, elastic, slightly cloudy gel after 14 hours' heating at 50° C. and a hard interpolymer after heating for an additional 8½ hours at 90° C. It had about the same hardness as the interpolymer of Example 7.

EXAMPLE 9

|  | Parts |
|---|---|
| 2-nitroisobutyl methacrylate | 50 |
| Dimethyl itaconate | 50 | formed a somewhat soft interpolymer. When diethyl itaconate was substituted for dimethyl itaconate in the above formula, an even softer copolymer was obtained. Both copolymers became harder on prolonged heating.

EXAMPLE 10

|  | Parts |
|---|---|
| 2-nitroisobutyl methacrylate | 50 |
| Diallyl itaconate | 50 | yielded a very hard, insoluble and infusible copolymer. Substitution of diallyl oxalate for diallyl itaconate in the above formula gave an insoluble and infusible product which was not quite so hard, while diallyl phthalate and diallyl glutarate gave rubbery, elastic gels, which became somewhat harder on further heating.

It will be understood, of course, by those skilled in the art that this invention is not limited to the production of interpolymers of the particular nitro compounds with the particular polymerizable compounds given in the above illustrative examples and that we may use other nitroalcohol esters of unsaturated carboxylic acids and other —CH=C< compounds, numerous examples of which previously have been given. These prior examples included compounds containing a single $CH_2$=C< grouping, as well as compounds containing a plurality of $CH_2$=C< groupings.

As a more specific illustration of how the formulas of the above illustrative examples may be varied, we mention that the diallyl itaconate, diallyl oxalate, diallyl phthalate and diallyl glutarate of Example 10 may be increased or may be replaced in whole or in part by substances such, for instance, as diallyl carbonate, diallyl malonate, diallyl adipate, diallyl pimelate, diallyl suberate, diallyl azelaate, diallyl sebacate, diallyl alpha, alpha-dimethyl malonate, diallyl alpha-allyl malonate, diallyl maleate, diallyl fumarate, diallyl mesaconate, diallyl citraconate, diallyl tartrate, diallyl citrate, triallyl tricarballylate, diallyl glutaconate, diallyl hydromucate, diallyl glutinate, tetra-allyl symmetrical ethane tetracarboxylate, etc.; by polyhydric alcohol and unsaturated alcohol esters of acrylic and methacrylic acids, e. g., glycol (ethylene glycol) acrylate, glycol dimethacrylate, diethylene glycol acrylate, allyl methacrylate, methallyl acrylate, methallyl methacrylate, etc.; or by mixtures of such substances. Also, these polymerizable materials may replace a part of the 2-nitroisobutyl methacrylate or of the methyl methacrylate, ethyl methacrylate, methyl acrylate, ethyl acrylate, dimethyl itaconate and diethyl itaconate of Examples 5 to 9, inclusive, to impart insolubility, infusibility or insolubility and infusibility to the resulting interpolymers.

In certain cases, instead of copolymerizing a single nitroalcohol ester of an unsaturated carboxylic acid, more particularly an acrylic ester of a nitroalcohol, with a single —CH=C<-containing compound copolymerizable with such ester, we may copolymerize a plurality of such esters either with a single organic compound having a —CH=C< grouping and copolymerizable with such ester, or with a plurality of such compounds. In this way it is possible to obtain a composition comprising a mixture of interpolymers best adapted to meet a particular service application.

Although in the foregoing examples we have shown interpolymerization products of 50 per cent by weight of a nitroalcohol ester of an unsaturated carboxylic acid with 50 per cent by weight of a —CH=C<-containing compound copolymerizable with such ester, it will be understood of course that we are not limited to these particular proportions of components in producing our new compositions. Thus, in the production of organic plastic masses or coating compositions for certain particular applications, or with certain —CH=C< compounds, for example diallyl itaconate, dimethallyl itaconate, and the like, the —CH=C< compound may constitute as much as 98 to 99 per cent by weight of the whole. In such cases the nitroalcohol ester usually serves mainly as an internal plasticizer of the —CH=C< compound. In general, the proportions will be varied depending upon the particular properties desired in the interpolymer. For most applications we prefer to use from 10 to 90 per cent by weight of nitroalcohol ester to from 90 to 10 per cent by weight of the —CH=C< compound, specifically a $CH_2$=C< compound.

The interpolymerization products have a wide range of properties. Depending, for example, upon the particular nitroalcohol ester and the particular —CH=C<-containing compound copolymerizable with such ester that is employed, the particular proportions thereof, the conditions of polymerization (temperature, time, pressure, presence or absence of catalyst, kind of catalyst used, if any, as well as the catalyst concentration, etc.) and the extent of the interpolymerization, they vary from soft, flexible, soluble bodies to hard, rigid masses of varying resistance to solvents. In intermediate stages of copolymerization some form fluid compositions of varying intrinsic viscosities and may be so used. For coating or impregnating applications where the presence of a small amount of solvent in the cured composition is not objectionable, the mixed starting components may be diluted with volatile or non-volatile solvents to viscosities best adapted to meet the particular service application, and then may be copolymerized after application of the solution to the particular article to be coated or coated and impregnated. By suitable selection of the starting materials and the conditions of interpolymerization, interpolymers can be obtained in an insoluble, infusible state practically resistant to the destructive effect of other chemical bodies such as acids, bases, solvents and the like.

The simple and mixed monomers may be converted to polymers or interpolymers in molds with or without the application of pressure, in the presence of a material which is a solvent for the monomer but not for the polymer, or one which is a solvent for both monomer and polymer, or one which is not a solvent for either the monomer or polymer so that spongy or granulated polymeric modifications are obtained.

These new compositions may be used alone or with fillers, dyes, pigments, opacifiers, lubricants, plasticizers, or other modifying bodies in, for example, casting, molding and laminating applications, and as adhesives, impregnants and surface-coating materials.

As modifying agents various fillers may be used, for example, wood flour, alpha-cellulose in flock form, sand, powdered or flake mica, cellulosic materials such as cellulose itself, regenerated cellulose, cellulose ethers, sheets or cuttings of paper, cloth, canvas, etc., asbestos in powdered or long or short fiber length, short or long wood fibers, synthetic or natural continuous threaded fibers, glass fibers in continuous filament or fabric (woven or felted) form, etc.

The modifying bodies also may take the form of high molecular weight bodies with or without resinous characteristics, for example, partially hydrolyzed wood products, lignin, proteins, protein-aldehyde condensation products, furfural condensation products, phenol-aldehyde condensation products, urea-aldehyde condensation products, aniline-aldehyde condensation products, sulfonamide-adehyde condensation products, natural gums and resins such as copal, shellac, rosin, etc., polyvinyl compounds such as polyvinyl alcohol, polyvinyl acetals such as polyvinyl formal, synthetic linear condensation superpolymers, e. g., the superpolyamides, polyhalogenated aromatic derivatives, etc.

In coating, impregnating and similar applications the monomeric or partly polymerized materials of this invention, without added solvent, may be applied to the object to be treated and polymerized as hereinbefore described, with or without the application of pressure, to form the polymer or copolymer in situ. These new synthetic materials may be used as impregnants for many porous bodies, such as cork, pottery, felts, or fabricated bodies with interstices, such as the windings of electrical coils, netted fibers, interwoven fibrous materials, etc. They also may be employed for protectively coating impervious materials such as metals, or for coating or, in certain cases, coating and impregnating articles such as paper, wood, cloth, glass fibers in felted, woven or other form, concrete, linoleum, synthetic boards, etc. These new synthetic bodies also may be used in making laminated fibrous sheet materials wherein superimposed layers of cloth, paper, etc., are firmly bonded together with the synthetic body.

The simple or mixed monomers or partial polymers, with or without modifying agents, may be cast and molded under heat or under heat and pressure. The solid thermoplastic and thermosetting bodies of this invention also may be molded by injection, extrusion or compression molding technique whereby they are converted (heat- and pressure-hardened in the case of thermosetting bodies) into a variety of molded articles for industrial, household and novelty uses.

What we claim as new and desire to secure by Letters Patent of the United States is:

1. An aliphatic nitroalcohol ester of acrylic acid.

2. A polymerized acrylic ester of an aliphatic nitroalcohol.

3. An ester of a monohydric aliphatic nitroalcohol with acrylic acid.

4. A polymerized ester of a monohydric aliphatic nitroalcohol with acrylic acid.

5. An acrylic ester of a nitrobutyl alcohol.

6. A polymerized acrylic ester of a nitrobutyl alcohol.

7. 2-nitrobutyl acrylate.

8. Polymeric 2-nitrobutyl acrylate.

9. As a new product, an interpolymer obtained by polymerization of a mixture comprising an ester of an aliphatic nitroalcohol and acrylic acid and a different polymerizable organic compound containing at least one $CH_2=C<$ grouping.

10. A composition comprising an interpolymer of ingredients comprising an ester of an aliphatic nitroalcohol and acrylic acid and a different organic compound copolymerizable with the said ester and containing a plurality of $CH_2=C<$ groupings.

11. A composition comprising an interpolymer of ingredients including an ester of a monohydric aliphatic nitroalcohol and acrylic acid and an organic compound copolymerizable with the said ester and containing a $CH_2=C<$ grouping.

GAETANO F. D'ALELIO.
JAMES W. UNDERWOOD.

REFERENCES CITED

The following references are of record in the file of this patent:

UNITED STATES PATENTS

| Number | Name | Date |
|---|---|---|
| 2,378,169 | Agre et al. | June 12, 1945 |

Certificate of Correction

Patent No. 2,449,804. September 21, 1948.

GAETANO F. D'ALELIO ET AL.

It is hereby certified that errors appear in the printed specification of the above numbered patent requiring correction as follows:

Column 6, line 62, for "wtih" read *with*; column 7, line 23, for "wtih" read *with*; line 29, for "78°–196° C." read *78°–106° C.*; column 8, line 1, for "2-ntiroisobutyl" read *2-nitroisobutyl*;

and that the said Letters Patent should be read with these corrections therein that the same may conform to the record of the case in the Patent Office.

Signed and sealed this 1st day of March, A. D. 1949.

[SEAL]

THOMAS F. MURPHY,
*Assistant Commissioner of Patents.*

4. A polymerized ester of a monohydric aliphatic nitroalcohol with acrylic acid.

5. An acrylic ester of a nitrobutyl alcohol.

6. A polymerized acrylic ester of a nitrobutyl alcohol.

7. 2-nitrobutyl acrylate.

8. Polymeric 2-nitrobutyl acrylate.

9. As a new product, an interpolymer obtained by polymerization of a mixture comprising an ester of an aliphatic nitroalcohol and acrylic acid and a different polymerizable organic compound containing at least one $CH_2=C<$ grouping.

10. A composition comprising an interpolymer of ingredients comprising an ester of an aliphatic nitroalcohol and acrylic acid and a different organic compound copolymerizable with the said ester and containing a plurality of $CH_2=C<$ groupings.

11. A composition comprising an interpolymer of ingredients including an ester of a monohydric aliphatic nitroalcohol and acrylic acid and an organic compound copolymerizable with the said ester and containing a $CH_2=C<$ grouping.

GAETANO F. D'ALELIO.
JAMES W. UNDERWOOD.

REFERENCES CITED

The following references are of record in the file of this patent:

UNITED STATES PATENTS

| Number | Name | Date |
| --- | --- | --- |
| 2,378,169 | Agre et al. | June 12, 1945 |

Certificate of Correction

Patent No. 2,449,804.  September 21, 1948.

GAETANO F. D'ALELIO ET AL.

It is hereby certified that errors appear in the printed specification of the above numbered patent requiring correction as follows:

Column 6, line 62, for "wtih" read *with*; column 7, line 23, for "wtih" read *with*; line 29, for "78°–196° C." read *78°–106° C.*; column 8, line 1, for "2-ntiroisobutyl" read *2-nitroisobutyl*;

and that the said Letters Patent should be read with these corrections therein that the same may conform to the record of the case in the Patent Office.

Signed and sealed this 1st day of March, A. D. 1949.

[SEAL]

THOMAS F. MURPHY,
*Assistant Commissioner of Patents.*